United States Patent [19]

Specht

[11] Patent Number: 5,566,420
[45] Date of Patent: Oct. 22, 1996

[54] DEVICE FOR CLEANING THE SURFACE OF A TIRE

[76] Inventor: Mary Specht, 9 Cedar La., Setauket, N.Y. 11733

[21] Appl. No.: 617,544

[22] Filed: Mar. 19, 1996

[51] Int. Cl.$^6$ ............................ A46B 15/00; A46B 13/02
[52] U.S. Cl. .................. 15/256.5; 15/256.51; 280/855
[58] Field of Search ..................... 15/4, 160, 88.1, 15/53.4, 256.5, 256.51, DIG. 2; 280/855, 856

[56] References Cited

U.S. PATENT DOCUMENTS

| | | | |
|---|---|---|---|
| 952,144 | 3/1910 | Sauer | 280/855 |
| 3,048,866 | 8/1962 | Thompson | 15/160 |
| 3,231,293 | 1/1966 | Loustaunau | 15/160 |
| 3,366,390 | 1/1968 | Applequist et al. | 15/256.5 |
| 5,188,394 | 2/1993 | Roche et al. | 280/856 |
| 5,443,125 | 8/1995 | Clark et al. | 280/855 |

FOREIGN PATENT DOCUMENTS

| | | | |
|---|---|---|---|
| 725684 | 5/1932 | France | 280/855 |
| 44447 | 4/1909 | Switzerland | 280/855 |

*Primary Examiner*—David Scherbel
*Assistant Examiner*—Terrence R. Till

[57] ABSTRACT

The present invention relates to a device for cleaning the surface of a tire. In its broadest context, the present invention includes a housing which is adapted to be secured to the wheel well of a vehicle. A motor with an associated positioning system is secured within the housing. The positioning system takes the form of a threaded screw with an associated coupling nut. A brush with corresponding bristles is secured to the lower extent of the coupling nut. Thus, the positioning system can be employed to position the bristles of the brush upon the surface of a tire tread to be cleaned.

3 Claims, 3 Drawing Sheets

DEVICE FOR CLEANING THE SURFACE OF A TIRE

BACKGROUND OF THE INVENTION

1. Field of the Invention

The present invention relates to a device for cleaning the surface of a tire and, more particularly, pertains to automatically cleaning the surface of a tire.

2. Description of the Prior Art

The use of cleaning brushes is known in the prior art. More specifically, cleaning brushes heretofore devised and utilized for the purpose of cleaning tires are known to consist basically of familiar, expected, and obvious structural configurations, notwithstanding the myriad of designs encompassed by the crowded prior art which has been developed for the fulfillment of countless objectives and requirements.

By way of example, the prior art in U.S. Pat. Nos. 4,985,975; 5,125,981 and 5,123,136 to Belanger discloses wheel washing apparatuses. Furthermore, U.S. Pat. No. 5,161,281 to Hanen and U.S. Pat. No. 4,020,518 to Harding each disclose apparatuses for cleaning wheel rims or tires. Lastly, U.S. Pat. No. 5,188,394 to Roche et al. illustrates a scraper for removing mud from a vehicle having two-bolt tires.

In this respect, the device for cleaning the surface of a tire according to the present invention substantially departs from the conventional concepts and designs of the prior art, and in so doing provides an apparatus primarily developed for the purpose of automatically cleaning the surface of a tire. The present invention is intended primarily for cleaning snow from the surface of a tire.

Therefore, it can be appreciated that there exists a continuing need for a new and improved device for cleaning the surface of a tire which can be used for automatically cleaning the surface of a tire. In this regard, the present invention substantially fulfills this need.

SUMMARY OF THE INVENTION

In view of the foregoing disadvantages inherent in the known types of cleaning brushes now present in the prior art, the present invention provides an improved device for cleaning the surface of a tire. As such, the general purpose of the present invention, which will be described subsequently in greater detail, is to provide a new and improved device for cleaning the surface of a tire and method which has all the advantages of the prior art and none of the disadvantages.

To attain this, the present invention essentially comprises a device adapted to be coupled to a wheel well of an automobile which functions to clear debris from a tire tread. The device includes a housing having an upper portion, a lower portion and an intermediate extent therebetween. The upper portion is coupled to the wheel well of an automobile. Furthermore, the housing includes an aperture in its upper portion and an opening formed through its lower portion. The housing has a hollow interior, with the hollow interior being defined by an upper extent and a lower extent. A motor is mounted within the upper extent of the hollow interior of the housing. Furthermore, an electric cord for delivering power to the motor is coupled through the aperture of the upper portion of the housing. A threaded screw, defined by an upper extent, a lower extent and an intermediate extent therebetween, is coupled to the motor by way of the upper extent of the threaded screw. This motor serves to selectively rotate the threaded screw in one of two senses. Additionally, a coupling nut is threadedly coupled to the threaded screw. This coupling nut is defined by an upper extent, a lower extent and with an intermediate extent therebetween. Furthermore, the device includes a brush which has a lower portion with bristles and an upper portion which extends through the opening of the housing and is secured to the lower extent of the coupling nut. The motor serves to rotate the threaded bolt which in turn effects linear movement of the coupling nut to selectively position the brush above the surface of the tire tread to be cleaned.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved device for cleaning the surface of a tire which has all the advantages of the prior art cleaning brushes and none of the disadvantages.

It is another object of the present invention to provide a new and improved device for cleaning the surface of a tire which may be easily and efficiently manufactured and marketed.

It is a further object of the present invention to provide a new and improved device for cleaning the surface of a tire which is of a durable and reliable construction.

An even further object of the present invention is to provide a new and improved device for cleaning the surface of a tire which is susceptible of a low cost of manufacture with regard to both materials and labor, and which accordingly is then susceptible of low prices of sale to the consuming public, thereby making such cleaning brushes economically available to the buying public.

Still yet another object of the present invention is to provide a new and improved device for cleaning the surface of a tire which provides in the apparatuses and methods of the prior art some of the advantages thereof, while simultaneously overcoming some of the disadvantages normally associated therewith.

Even still another object of the present invention is to automatically clean the surface of a tire.

Lastly, it is an object of the present invention to provide a device for cleaning the surface of a tire. The present invention is primarily intended for removing snow. In its broadest context, the present invention includes a housing which is adapted to be secured to the wheel well of a vehicle. A motor with an associated positioning system is secured within the housing. The positioning system takes the form of a threaded screw with an associated coupling nut. A brush with corresponding bristles is secured to the lower extent of the coupling nut. Thus, the positioning system can be employed to position the bristles of the brush upon the surface of a tire tread to be cleaned.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
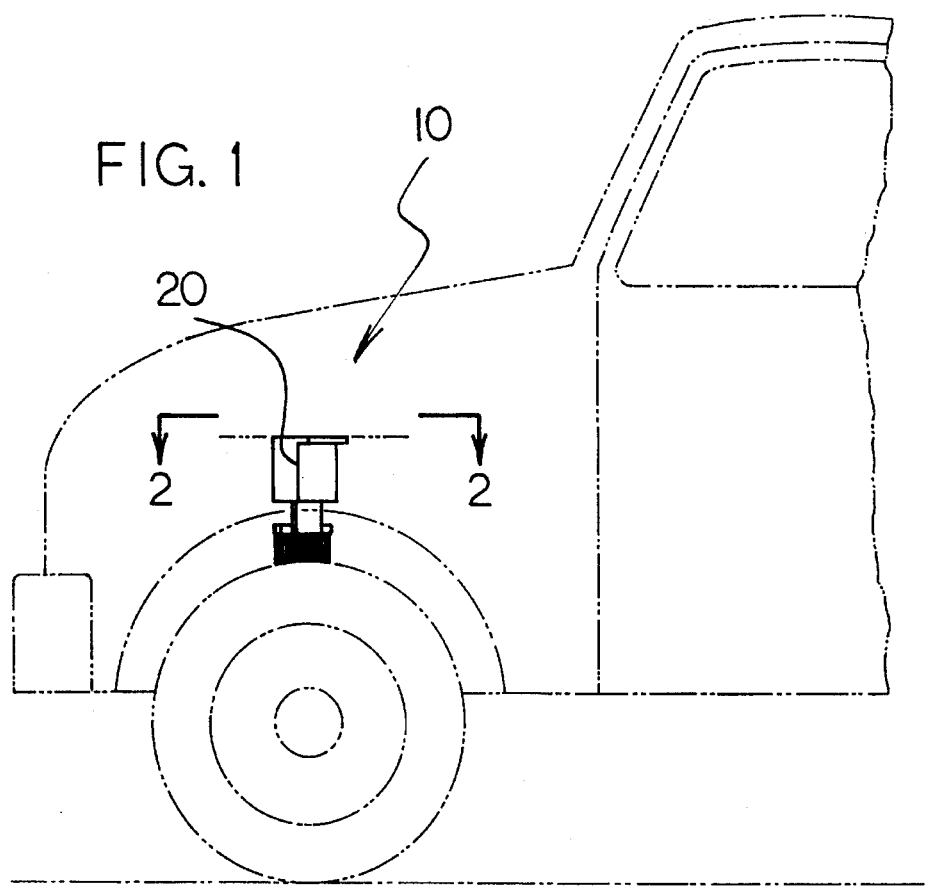
FIG. 1 is a perspective illustration of the device for cleaning the surface of a vehicle tire.

With reference now to the drawings, and in particular to FIG. 1 thereof, the preferred embodiment of the new and improved device for cleaning the surface of a tire embodying the principles and concepts of the present invention and generally designated by the reference numeral 10 will be described.

The present invention relates to a device 10 which is adapted to be secured to the wheel well of an automobile. This device functions in clearing debris from a tire tread. In its broadest context, the present invention includes a housing, a motor positioned within the housing and a linearly movable brush which is adapted to be positioned adjacent the treads of a tire. The various components of the present invention, as well as the manner in which they interrelate, will be described in greater detail hereinafter.

The housing 20 of the present invention is defined by an upper portion, a lower portion with an intermediate extent positioned therebetween. The upper portion of this housing 20 is adapted to be coupled to the wheel well of an automobile. This coupling can be achieved in any number of ways, however in the preferred embodiment the upper portion of the housing is bolted to the interior portion of the wheel well. This coupling arrangement provides for a secure engagement and minimizes any relative movement between the wheel well and the remainder of the device 10. The housing 20 further includes an aperture 22 which is formed within its upper portion, and an opening 24 which is formed through its lower portion. The function of the aperture and opening will be described in greater detail hereinafter. The housing 20 further includes a hollow interior with the hollow interior being defined by an upper extent and a lower extent. The housing as best described is constructed from a non-corrosive metal such as stainless steel or aluminum.

A motor 26 is mounted within the upper extent of the hollow interior of the housing 20. The function of this motor will be described in greater detail hereinafter. In order to deliver power to the motor 26, an electric cord 28 is coupled to the motor 26 through the aperture 22. Furthermore, a coupling means can be provided within the interior passenger compartment of the automobile. This control means would be used for selectively delivering power to the motor of the device. Thus, the motor, which is employed in engaging the brush upon the tire tread in accordance with the present invention, can be controlled from the interior portion of the automobile.

The motor 26 engages the brush upon the vehicle tire tread by way of a positioning system. This positioning system is defined by a threaded screw 32 and a coupling nut 34. The threaded screw 32 is defined by an upper extent and a lower extent with an intermediate extent therebetween. The upper extent of this threaded screw 32 is coupled to the motor 26. This coupling is such that the motor 26 can be employed to selectively rotate the threaded screw 32 in one of two senses. The coupling nut 34 is threadably received upon the threaded screw 32. As with the threaded screw the coupling nut 34 is defined by an upper extent and a lower extent with an intermediate extent therebetween.

Figure 2:
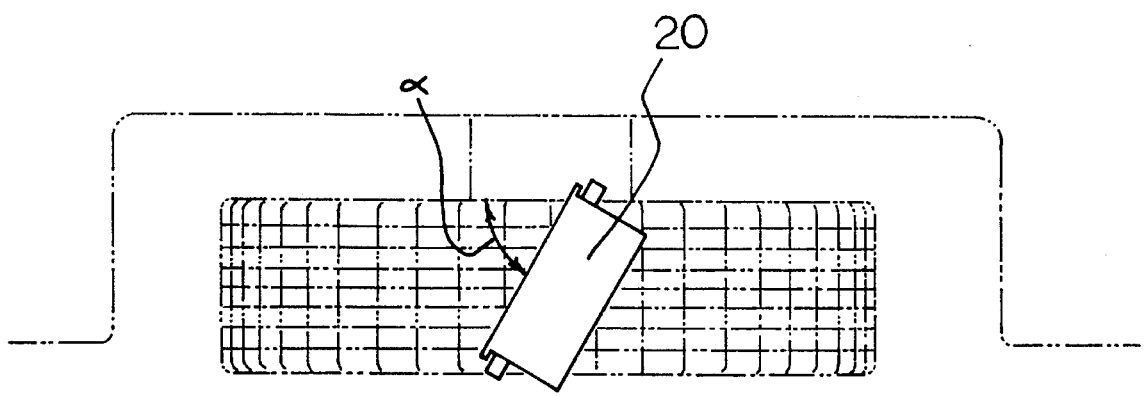
FIG. 2 is a view taken along line 2—2 of FIG. 1.
Figure 3:
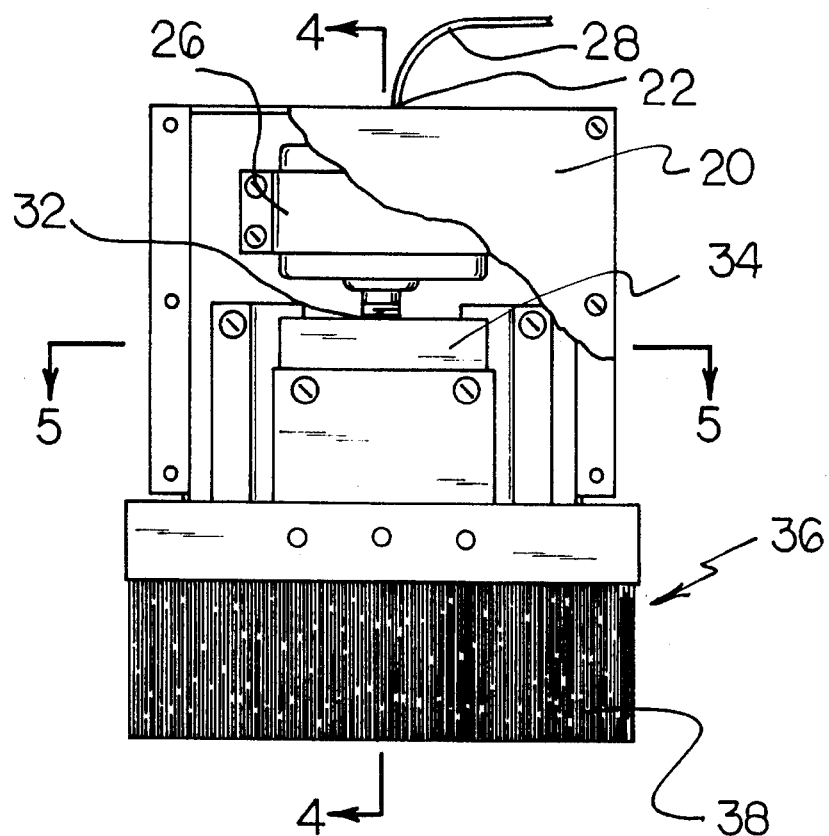
FIG. 3 is a sectional view of the device in accordance with the present invention.
Figure 4:
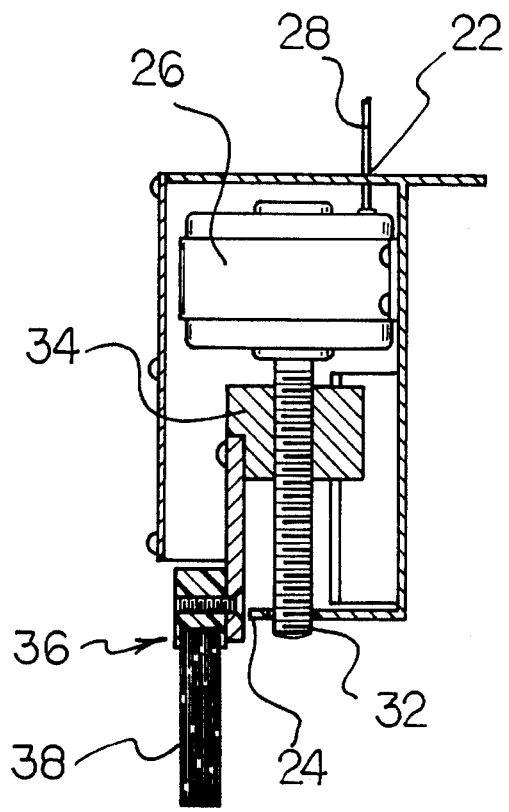
FIG. 4 is a view taken along line 4—4 of FIG. 3.
Figure 5:
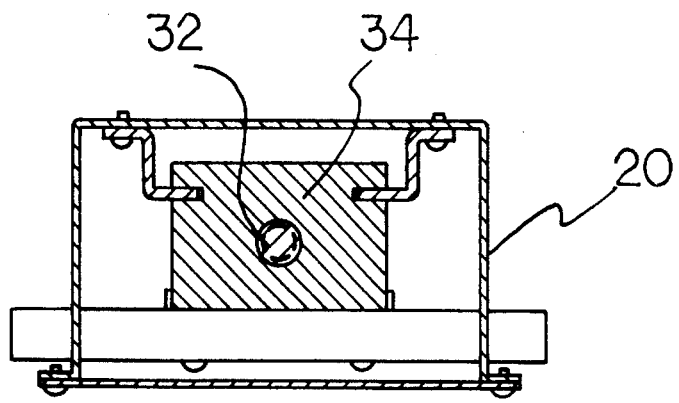
FIG. 5 is a view taken along 5—5 of FIG. 3.
Figure 6:
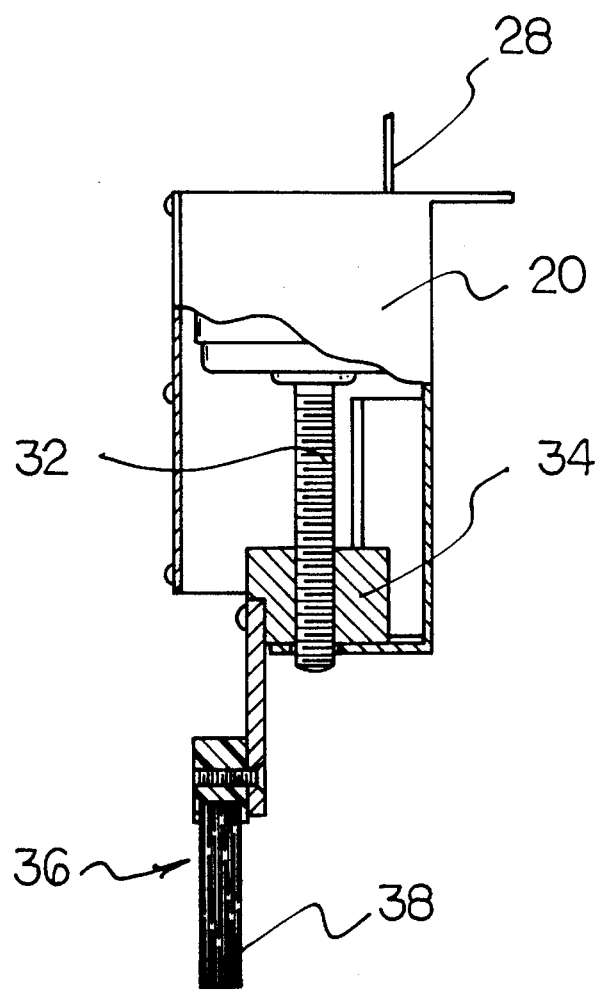
FIG. 6 is a side sectional view of the device in accordance with the present invention with the brush in its lowered position.

The brush 36 which is employed in the present invention is defined by a lower portion with bristles 38 attached thereto and an upper portion. The upper portion of the brush extends through the opening 24 of the housing 20 and is secured to the lower extent of the coupling nut 34. Thus, what has been described is a motor which is positionable within the hollow interior of a housing with a positioning system interconnecting the motor and a brush. In operation, when a passenger or operator within the vehicle determines that the treads upon one or more of the tires needs to be cleaned, he or she, by way of the control system, effects delivery of power to the motor. The motor is then rotated in a first sense which, in turn, rotates the threaded screw and, in turn, the coupling nut. With the threaded screw rotating in a first sense, the coupling nut travels linearly away from the motor towards the tire tread. Consequently, the brush with the corresponding bristles positioned at the end of the coupling nut travel linearly towards the surface of the tire. This linear movement of the brush and coupling nut is halted when the brush reaches the surface of the tire. The brush then effects the cleaning of the tire treads. In order to efficiently clean the tire treads, the brush is positioned at an angle relative to the surface of the tire to be cleaned. The angle is such that, with the vehicle moving in a forward direction, the snow is directed to the side of the vehicle. Alternatively, when the vehicle is moving in a rearward direction, the snow is directed to the center of the vehicle. As depicted in FIG. 2, the angle formed between the longitudinal direction of the tire and the length of the brush is represented by alpha. In the preferred embodiment, alpha is equal to 45 degrees.

The present invention, although described above in terms of cleaning a single tire tread, can be used to clean four or more tire treads. This would be achieved by securing a device as described above into each of the wheel wells of the vehicle. The control means would be modified to enable the user to control the various brushes either concurrently or separately.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved device adapted to be coupled to a wheel well of an automobile, the device functioning to clear debris from a tire tread, the device comprising, in combination:

a housing having an upper portion, a lower portion and an intermediate extent therebetween, the upper portion coupled to the wheel well of an automobile, an aperture formed within the upper portion, and an opening formed through the lower portion, the housing have a hollow interior, the hollow interior having an upper extent and a lower extent;

a motor mounted within the upper extent of the hollow interior of the housing, an electric cord for delivering power to the motor, the cord coupled to the motor through the aperture of the upper portion;

a threaded screw having an upper extent, a lower extent and an intermediate extent therebetween, the upper extent of the threaded screw coupled to the motor, the motor serving to selectively rotate the threaded screw in one of two senses;

a coupling nut threadedly coupled to the threaded screw, the coupling nut having an upper extent and a lower extent with an intermediate extent therebetween; and a brush having a lower portion with bristles and an upper portion extending through the opening of the housing and secured to the lower extent of the coupling nut, the motor effecting rotation of the threaded bolt which in turns effects linear movement of the coupling nut to selectively position the brush.

2. A device adapted to be coupled to a wheel well of an automobile, the device functioning to clear debris from a tire tread, the device comprising:

a housing having an upper portion, a lower portion and an intermediate extent therebetween, the upper portion coupled to the wheel well of an automobile, an aperture formed within the upper portion, and an opening formed through the lower portion, the housing have a hollow interior, the hollow interior having an upper extent and a lower extent;

a motor mounted within the upper extent of the hollow interior of the housing, an electric cord for delivering power to the motor, the cord coupled to the motor through the aperture of the upper portion;

positioning means positioned within the housing; and a brush having a lower portion with bristles and an upper portion extending through the opening of the housing, the positioning means serving to selectively position the brush above the surface of the tire to be cleaned.

3. The device as described in claim 2 wherein:

the positioning means within the housing includes a threaded screw having an upper extent, a lower extent and an intermediate extent therebetween, the upper extent of the threaded screw coupled to the motor, the motor serving to selectively rotate the threaded screw in one of two senses; and a coupling nut threadedly coupled to the threaded screw, the coupling nut having an upper extent and a lower extent with an intermediate extent therebetween.

* * * * *